United States Patent
Park et al.

(10) Patent No.: US 10,059,365 B2
(45) Date of Patent: Aug. 28, 2018

(54) TILTING STRUCTURE OF ELECTRIC POWER STEERING APPARATUS AND ELECTRIC POWER STEERING APPARATUS INCLUDING SAME

(71) Applicant: erae AMS Co., Ltd., Daegu (KR)

(72) Inventors: Se-Jung Park, Daegu (KR); Chang-Wook Son, Daegu (KR); Bong-Ju Kim, Daegu (KR); Seong-Nam Kim, Daegu (KR)

(73) Assignee: erae AMS Co., Ltd., Daegu (KR)

( * ) Notice: Subject to any disclaimer, the term of this patent is extended or adjusted under 35 U.S.C. 154(b) by 0 days.

(21) Appl. No.: 15/313,380

(22) PCT Filed: May 22, 2015

(86) PCT No.: PCT/KR2015/005161
§ 371 (c)(1),
(2) Date: Nov. 22, 2016

(87) PCT Pub. No.: WO2015/178722
PCT Pub. Date: Nov. 26, 2015

(65) Prior Publication Data
US 2017/0190352 A1    Jul. 6, 2017

(30) Foreign Application Priority Data

May 23, 2014   (KR) ........................ 10-2014-0062396

(51) Int. Cl.
*B62D 1/16*    (2006.01)
*B62D 5/04*    (2006.01)
*F16H 1/16*    (2006.01)
(Continued)

(52) U.S. Cl.
CPC ......... *B62D 5/0409* (2013.01); *B62D 5/0403* (2013.01); *F16H 1/16* (2013.01);
(Continued)

(58) Field of Classification Search
CPC ........................... B62D 5/0409; B62D 5/0403
(Continued)

(56) References Cited

U.S. PATENT DOCUMENTS 6,761,244 B2    7/2004  Sano et al.
8,443,689 B2 *  5/2013  Kawakubo ............ B62D 3/123
                                                    74/422
(Continued)

FOREIGN PATENT DOCUMENTS

DE    102010002285 A1    8/2011
EP        1069330 A2    1/2001
(Continued)

*Primary Examiner* — Tony H Winner
(74) *Attorney, Agent, or Firm* — Novick, Kim & Lee, PLLC; Jae Youn Kim

(57) ABSTRACT

A tilting structure for providing a force for tilting a worm shaft of an electric power steering apparatus to a worm wheel includes: a guide block which is inserted into an insertion space of a housing of the electric power steering apparatus; an elastic member which is disposed within the guide block; and a plug which is movably disposed within the guide block and is elastically supported by the elastic member to exert a tilting force to a bearing which supports the worm shaft. The plug and the guide block are configured to be able to be connected to one another via a thread coupling.

16 Claims, 4 Drawing Sheets

(51) Int. Cl.
*F16H 57/12* (2006.01)
*F16H 57/039* (2012.01)
*F16H 57/02* (2012.01)

(52) U.S. Cl.
CPC .......... *F16H 57/039* (2013.01); *F16H 57/12* (2013.01); *F16H 2057/02034* (2013.01); *F16H 2057/126* (2013.01)

(58) Field of Classification Search
USPC ............................................ 180/444; 74/425
See application file for complete search history.

(56) References Cited

U.S. PATENT DOCUMENTS

| | | | | |
|---|---|---|---|---|
| 2003/0136211 A1* | 7/2003 | Ishii | ................ | B62D 5/0409 74/388 PS |
| 2014/0174843 A1* | 6/2014 | Kimoto | ................ | B62D 5/0424 180/444 |
| 2015/0266506 A1* | 9/2015 | Sato | ................ | B62D 5/0421 180/444 |
| 2016/0185381 A1* | 6/2016 | Noguchi | ................ | B62D 5/0409 180/444 |

FOREIGN PATENT DOCUMENTS

| | | |
|---|---|---|
| EP | 1335154 A1 | 8/2003 |
| JP | 2002-098198 A | 4/2002 |
| JP | 2010-023772 A | 2/2010 |
| KR | 10-2008-0036303 A | 4/2008 |
| KR | 10-1124840 B1 | 3/2012 |
| KR | 10-2012-0137035 A | 12/2012 |
| KR | 10-2012-0140303 A | 12/2012 |
| KR | 10-2013-0003312 A | 1/2013 |

\* cited by examiner

TILTING STRUCTURE OF ELECTRIC POWER STEERING APPARATUS AND ELECTRIC POWER STEERING APPARATUS INCLUDING SAME

CROSS-REFERENCE TO RELATED APPLICATION

This application is a national-entry under 35 USC § 371 of PCT/KR2015/005161 filed on May 22, 2015, and claims priority to Korean Patent Application No. 10-2014-0062396 filed in the Korean Intellectual Property Office on May 23, 2014, the entire contents of which are incorporated herein by reference.

TECHNICAL FIELD

The present invention relates to a tilting structure for tilting a worm shaft of an electric power steering apparatus.

BACKGROUND ART

Electric power steering apparatus which assist a steering force of a vehicle using a driving force of a motor has been known. Among such electric power steering apparatus, a column-type electric power steering apparatus which transmits a driving force of a motor to a steering shaft such as a steering column has been introduced.

Generally, an electric power steering apparatus controls a motor based on driving conditions such as a vehicle speed and a steering torque obtained from a vehicle speed sensor and a steering torque sensor to assist a steering force and to enhance a steering feeling.

In a column-type electric power steering apparatus, a worm gear is provided to a worm shaft which is connected to an outer shaft of a motor and a worm wheel is provided to a steering shaft, and the worm gear and the worm wheel are engaged with one another so that a driving force of a motor is transmitted to a steering shaft.

Such a column-type electric power steering apparatus may be exposed to problems of increase of backlash by clearance due to abrasion of gears or manufacturing clearance and vibration or noise. In order to solve these problems, an electric power steering apparatus having a tilting structure which tilts a worm shaft toward a worm wheel so as to compensate clearance due to abrasions has been introduced.

A conventional tilting structure has a structure extruded to the outside of an electric power steering apparatus, so it may be released or broken by external shock, and since it is configured to be able to regulate a tilting amount, clearance of a tilting structure and assembling clearance may also be added and this may negatively affect the performance of an electric power steering apparatus.

DETAILED DESCRIPTION OF THE INVENTION

Technical Problem

The present invention has been made in an effort to provide a tilting structure and an electric power steering apparatus including the same which can be easily assembled and has minimized clearances to have an enhanced performance.

Technical Solution

In an exemplary embodiment of the present invention, a tilting structure for providing a force for tilting a worm shaft of an electric power steering apparatus to a worm wheel includes: a guide block which is inserted into an insertion space of a housing of the electric power steering apparatus; an elastic member which is disposed within the guide block; and a plug which is movably disposed within the guide block and is elastically supported by the elastic member to exert a tilting force to a bearing which supports the worm shaft. The plug and the guide block are configured to be able to be connected to one another via a thread coupling.

A guide hole which guides movement of the plug may be formed in the guide block.

A guide groove may be formed on an outer surface of the guide block, and a guide protrusion which is inserted into the guide groove to be guided thereby may be formed in the housing.

The tilting structure may further include a snap ring which is connected to the guide block so as to prevent the plug from being separated from the guide block.

The guide block may include an auxiliary guide hole, and the guide block may include: a protrusion which is supported by the elastic member and is guided by the guide hole; and an insertion protrusion which is inserted into the auxiliary guide hole to be guided thereby.

The guide block and the plug may be configured to be able to be connected to one another via threads which are respectively formed on an outer surface of the insertion protrusion and an inner surface of the auxiliary guide hole, and the tilting structure may be installed in a state that the plug is connected to the guide block via a thread coupling in a state of being fixed to make the protrusion compress the elastic member.

The plug may be provided with a tool connecting portion for rotation by a tool after an installation.

An electric power steering apparatus according to an embodiment of the present invention includes: a motor; a worm shaft which is provided with a worm gear and is connected to an outer shaft of the motor so as to rotate therewith; a worm wheel which is coupled to a steering shaft and is engaged with the worm gear; a bearing which supports the worm shaft; and a tilting structure which exerts a tilting force to the bearing such that the worm shaft is tilted toward the worm wheel. The tilting structure includes: a guide block which is inserted into an insertion space of a housing of the electric power steering apparatus; an elastic member which is disposed within the guide block; and a plug which is movably disposed within the guide block and is elastically supported by the elastic member to exert a tilting force to a bearing which supports the worm shaft. The plug and the guide block are configured to be able to be connected to one another via a thread coupling.

Advantageous Effects

According to the present invention, a tilting structure can be easily assembled and clearances are minimized so that the performance of an electric power steering apparatus can be enhanced.

DETAILED DESCRIPTION OF THE EMBODIMENTS

An embodiment of the present invention will be explained in detail with reference to the accompanying drawings.

A motor 20 of an electric power steering apparatus generates a steering assistant force, and it is configured such that power of the motor 20 can be transmitted to a steering shaft 1.

Figure 1:
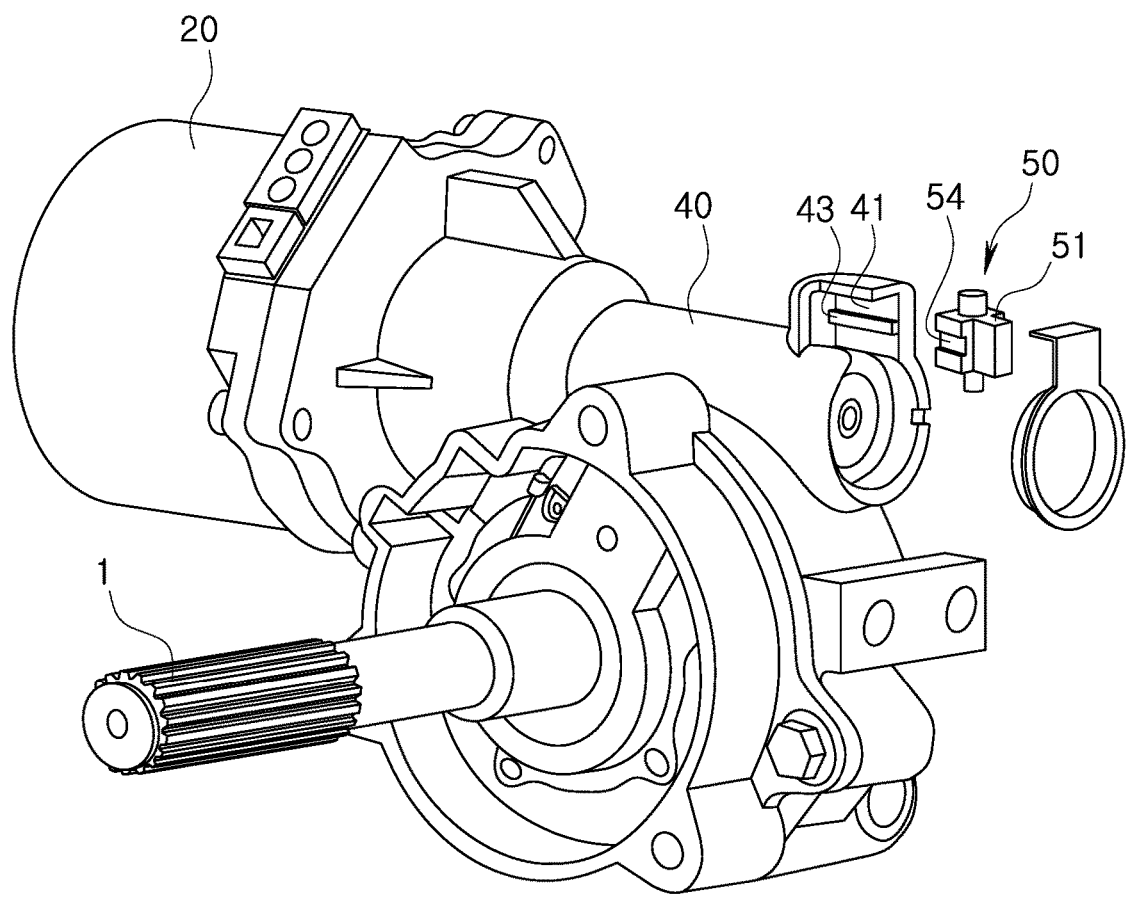
FIG. 1 is a schematic perspective view of an electric power steering apparatus according to an embodiment of the present invention.
Figure 2:
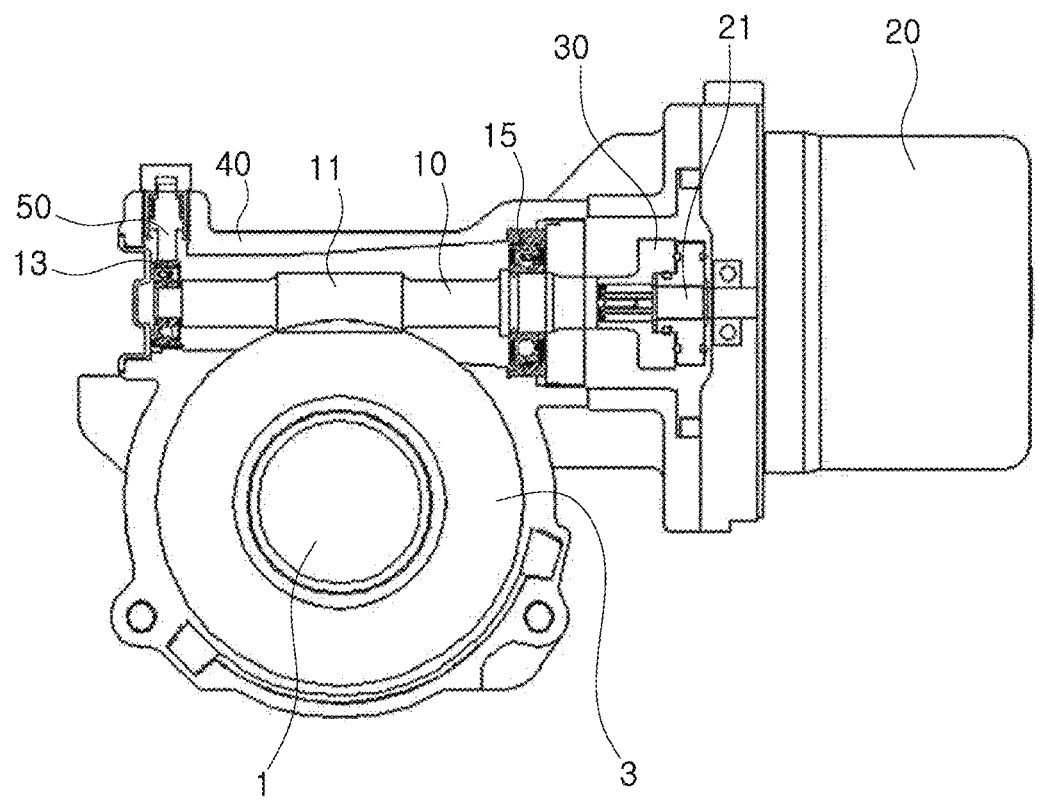
FIG. 2 is a partial sectional view of an electric power steering apparatus according to an embodiment of the present invention.

Referring to FIG. 1 and FIG. 2, a worm shaft 10 which is rotated by the power of the motor 20 is provided. The worm shaft 10 has a worm gear 11, and the worm gear 11 is engaged with a worm wheel 3 which is provided to the steering shaft 1. At this time, the worm shaft 10 is housed within a housing 40.

A motor coupling 30 may connect a motor output shaft 21 to the worm shaft 10. The motor coupling 30 is connected respectively to the output shaft 21 of the motor 20 and the worm shaft 10 to play a role of transmitting the power of the motor 20 to the worm shaft 10. The worm shaft 10 may be eccentrically connected to the output shaft 21 of the motor 20 via the motor coupling 30.

A tilting structure 50 which provides a force for tilting the worm shaft 10 toward the worm wheel 3 to the worm shaft 10 so that the clearance between the worm gear 11 and the worm wheel may be absorbed is provided. For example, the tilting structure 50 may be configured to support an outer surface of a bearing 13 which supports an end of the worm shaft 10. At this time, the worm shaft 10 may be rotatably supported by two bearings 13 and 15 which are respectively disposed on both ends thereof, and the tilting structure 50 may be disposed to support the beating 13 among the two bearings 13 and 15 which is disposed farther from the motor 20.

The tilting structure 50 elastically supports the bearing 13 supporting the worm shaft 10 to be biased in a direction (downward direction in FIG. 2) toward the worm wheel 13, so a clearance between the worm gear 11 and the worm wheel 13 may be compensated.

Figure 3:
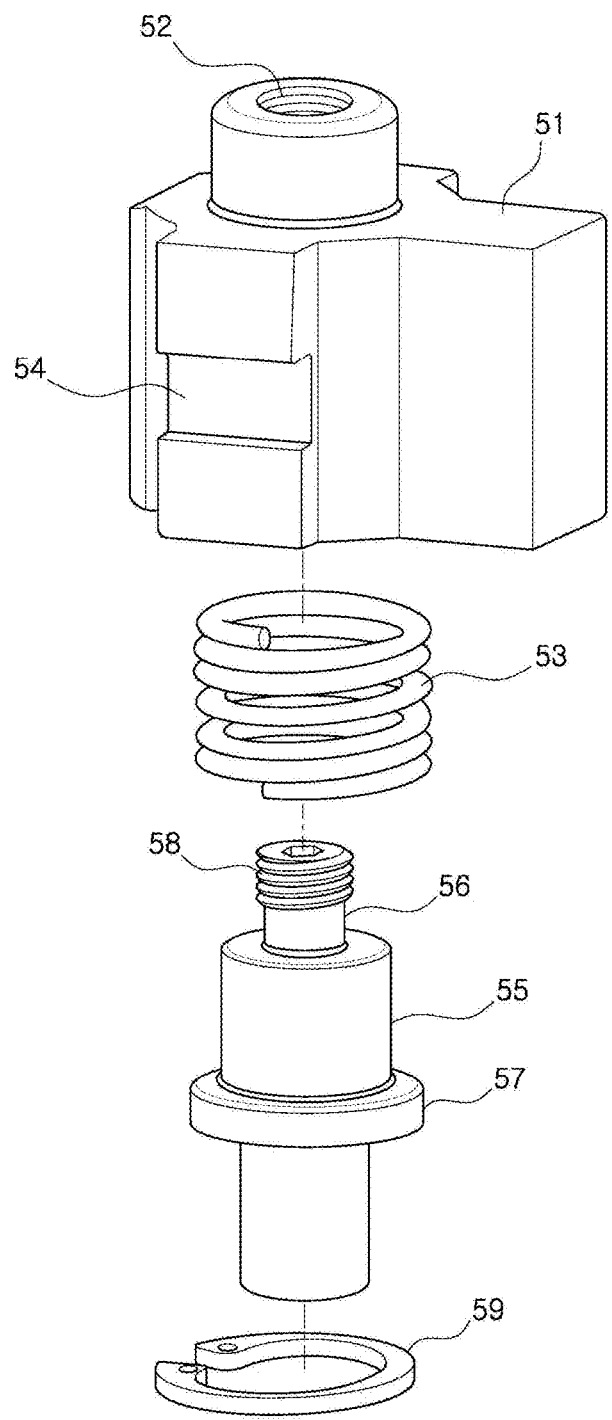
FIG. 3 is an exploded perspective view of an electric power steering apparatus according to an embodiment of the present invention.
Figure 4:
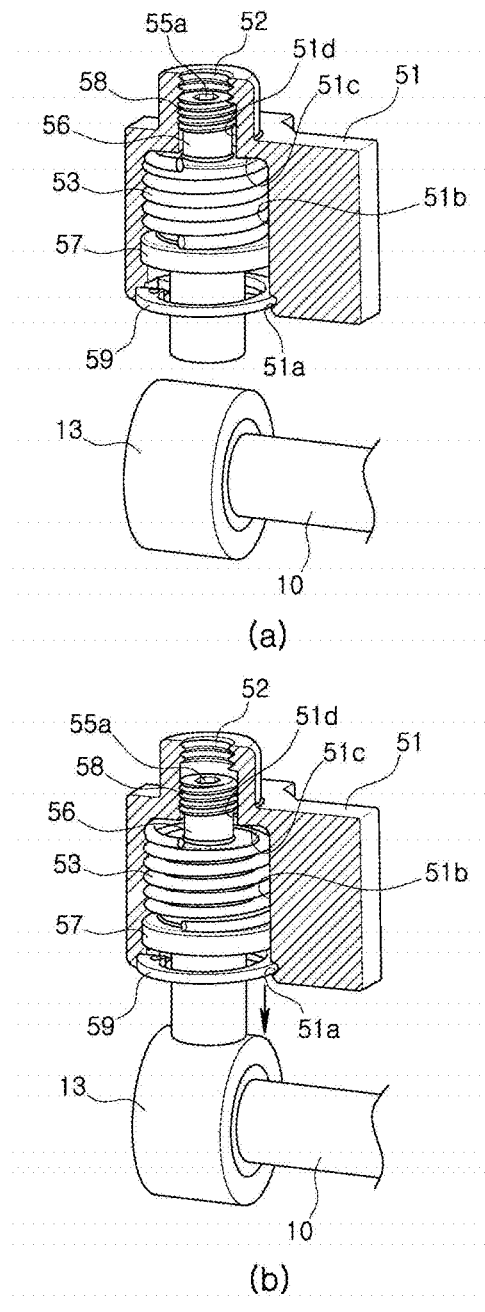
FIG. 4 is a drawing for explaining a mounting process of a tilting structure of an electric power steering apparatus according to an embodiment of the present invention.

Meanwhile, referring to FIG. 3 and FIG. 4, the tilting structure 50 may include a guide block 51, an elastic member 53 and a plug 55. For example, the elastic member 53 may be a coil spring.

The guide block 51 is inserted into an insertion space 41 which is provided to the housing 40. At this time, a guide groove 54 is formed on an outer surface of the guide block 51 and a guide protrusion 43 is provided in the insertion space 41, and the guide block 51 is inserted into the insertion space 41 in a state that the guide protrusion 43 is engaged with the guide groove 54.

A guide hole 51b may be formed in the guide block 51, and the elastic member 53 and the plug 55 may be disposed in the guide hole 51b as shown in FIG. 4.

The plug 55 is movably disposed within the guide block 51 and is elastically supported by the elastic member 53 so as to exert a tilting force to the bearing 13 which supports the worm shaft 10.

In more detail, the elastic member 53 is supported against a step 51c which is provided in the guide block 51 at one end thereof and supports a protrusion 57 which is formed on the plug 55 at the other end there. Accordingly, by an elastic resilient force of the elastic member 53, the plug 55 supports the bearing 13 which supports the worm shaft 10.

At this time, the protrusion 57 contacts an inner surface of the guide hole 51b of the guide block 51 to be guided. Meanwhile, an insertion protrusion 56 is formed at a frontal end of the plug 55, and the insertion protrusion 56 is inserted into an auxiliary guide hole 51d which is formed in the guide block 51. Accordingly, the guide block 51 and the plug 55 are connected via double guiding structure, so the elastic member 53 can be prevented from being inclined while being installed.

The tilting structure 50 according to an embodiment of the present invention has a unitary assembled structure for ease of an installation.

In detail, a thread 58 is formed on an outer surface of the insertion protrusion 56 and a thread 52 is also formed in an inner surface of the auxiliary guide hole 51d, and the guide block 51 and the plug 55 are connected to one another via a thread coupling between the both threads.

Referring to (a) of FIG. 4, before the tilting structure 50 is installed, the plug 55 is maintained to compress the elastic member 53 by the thread coupling of the guide block 51 and the plug 55. At this time, as shown in (a) of FIG. 4, the plug 55 is maintained at a state of being spaced from the bearing 13 which supports the worm shaft 10.

If the thread coupling of the guide block 51 and the plug 55 is released after the tilting structure 50 is inserted into the housing 40, the state shown in (b) of FIG. 4 is obtained. That is, by the release of the thread coupling of the guide block 51 and the plug 55, the plug 55 moves toward the bearing 13 by an elastic resilient force of the elastic member 53 so as to contact the bearing 13, and in this state the plug 55 is maintained at a state of continuously pushing the bearing 13 toward the worm wheel 3 by an elastic force of the elastic member 53. Accordingly, a clearance between the worm gear 11 and the worm wheel 3 can be automatically absorbed.

The thread coupling of the plug 55 and the guide block 51 can be released by rotating the plug 55 in a state that the tilting structure 50 is inserted into the housing, and for this a tool connecting portion 55a for rotating the plug 55 using a tool is provided to the plug 55. As shown in FIG. 3 and FIG. 4, the tool connecting portion 55a may be provided to the insertion protrusion 56, and for example may be a hexagonal indentation. By connecting a hexagonal wrench to the hexagonal indentation and rotating the plug 55, the thread coupling of the plug 55 and the guide block 51 can be released.

Meanwhile, the tilting structure 50 according to an embodiment of the present invention may further include a snap ring 59 which is coupled to the guide block 51 to prevent the plug 55 from being separated from the guide block 51. For example, as shown in FIG. 4, the snap ring 59 may be installed to a connection groove 51a which is formed on an inner surface of the guide block 51.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to an electric power steering apparatus and can be applied to a part of a vehicle, so the present invention has an industrial applicability.

The invention claimed is:

1. A tilting structure for providing a force for tilting a worm shaft of an electric power steering apparatus to a worm wheel, comprising:
a guide block which is inserted into an insertion space of a housing of the electric power steering apparatus;
an elastic member which is disposed within the guide block; and
a plug which is movably disposed within the guide block and is elastically supported by the elastic member to exert a tilting force to a bearing which supports the worm shaft,
wherein the plug and the guide block are configured to be connected to one another via a thread coupling.

2. The tilting structure of claim 1, wherein a guide hole which guides movement of the plug is formed in the guide block.

3. The tilting structure of claim 2, wherein the guide block comprises an auxiliary guide hole connected to the guide hole, and wherein the plug comprises: a protrusion which is disposed within the guide hole to be supported by the elastic member with respect to the guide block; and an insertion protrusion which is inserted into the auxiliary guide hole.

4. The tilting structure of claim 3, wherein the guide block and the plug are configured be connected to one another via threads which are respectively formed on an outer surface of the insertion protrusion and an inner surface of the auxiliary guide hole, and wherein the tilting structure is installed in a state that the plug is connected to the guide block via the thread coupling in a state of being fixed to make the protrusion compress the elastic member.

5. The tilting structure of claim 2, wherein a guide groove is formed on an outer surface of the guide block, and wherein a guide protrusion which is inserted into the guide groove to be guided thereby is formed in the housing.

6. The tilting structure of claim 1, wherein a guide groove is formed on an outer surface of the guide block, and wherein a guide protrusion which is inserted into the guide groove to be guided thereby is formed in the housing.

7. The tilting structure of claim 1, further comprising a snap ring which is connected to the guide block so as to prevent the plug from being separated from the guide block.

8. The tilting structure of claim 1, wherein the plug is provided with a tool connecting portion for rotation by a tool after an installation.

9. An electric power steering apparatus, comprising:
a motor;
a worm shaft which is provided with a worm gear and is connected to an outer shaft of the motor so as to rotate therewith;
a worm wheel which is coupled to a steering shaft and is engaged with the worm gear;
a bearing which supports the worm shaft; and
a tilting structure which exerts a tilting force to the bearing such that the worm shaft is tilted toward the worm wheel,
wherein the tilting structure comprises:
a guide block which is inserted into an insertion space of a housing of the electric power steering apparatus;
an elastic member which is disposed within the guide block; and
a plug which is movably disposed within the guide block and is elastically supported by the elastic member to exert a tilting force to a bearing which supports the worm shaft,
and wherein the plug and the guide block are configured to be connected to one another via a thread coupling.

10. The electric power steering apparatus of claim 9, wherein a guide hole which guides movement of the plug is formed in the guide block.

11. The electric power steering apparatus of claim 10, wherein the guide block comprises an auxiliary guide hole connected to the guide hole, and wherein the plug comprises: a protrusion which is disposed within the guide hole to be supported by the elastic member with respect to the guide block; and an insertion protrusion which is inserted into the auxiliary guide hole.

12. The electric power steering apparatus of claim 11, wherein the guide block and the plug are configured to be connected to one another via threads which are respectively formed on an outer surface of the insertion protrusion and an inner surface of the auxiliary guide hole, and wherein the tilting structure is installed in a state that the plug is connected to the guide block via the thread coupling in a state of being fixed to make the protrusion compress the elastic member.

13. The electric power steering apparatus of claim 10, wherein a guide groove is formed on an outer surface of the guide block, and wherein a guide protrusion which is inserted into the guide groove to be guided thereby is formed in the housing.

14. The electric power steering apparatus of claim 9, wherein a guide groove is formed on an outer surface of the guide block, and wherein a guide protrusion which is inserted into the guide groove to be guided thereby is formed in the housing.

15. The electric power steering apparatus of claim 9, wherein the tilting structure further comprises a snap ring which is connected to the guide block so as to prevent the plug from being separated from the guide block.

16. The electric power steering apparatus of claim 9, wherein the plug is provided with a tool connecting portion for rotation by a tool after an installation.

* * * * *